United States Patent Office 3,384,463
Patented May 21, 1968

3,384,463
GRAPHITE METAL BODY COMPOSITE
Franciszek Olstowski, Freeport, and John J. Newport III, Lake Jackson, Tex., assignors to The Dow Chemical Company, Midland, Mich., a corporation of Delaware
No Drawing. Filed Mar. 22, 1965, Ser. No. 441,879
8 Claims. (Cl. 29—180)

ABSTRACT OF THE DISCLOSURE

This invention relates to metal-expanded graphite composites which have a significantly lower density than the metal employed as the metal phase. Such composites contain from about 0.1 to about 25 weight percent of vermicular expanded graphite having a density of from about 0.2 to about 10 lbs. per cubic foot intimately admixed with the metal phase.

---

This invention relates to composition of matter comprising a low density metal body-graphite composite and, more particularly is concerned with a low density composite of expanded graphite dispersed throughout a matrix of a metal body.

The term "metal body" as used herein refers to metal fabrication of a single metal, a plurality of metals, such as alloys, which metals are characterized as being substantially unreactive with and non-dissolvent with expanded graphite at or above the melting temperature of said metal or alloy.

It is a principal object of the instant invention to provide a low density metal body-expanded graphite composite which contains preferably a substantially homogeneous dispersion of expanded graphite, is well cohered, has good structural integrity, contains essentially closed cell voids, and is compressible.

Other objects and advantages of the instant novel invention will become apparent from reading the detailed description thereof set forth hereinafter.

In general, the present novel invention is a low density metal body-expanded graphite composite which comprises from about 0.1 to about 25 weight percent expanded graphite dispersed throughout a matrix of a metal body, said composite being further characterized as one which contains essentially closed cell non-connecting gaseous voids, the voids being contained within the graphite particles. The metal body-expanded graphite composites have a density of from about 40 to about 80 percent of the density of the pure metal body. A microscopic study of the instant novel metal body-expanded graphite composite indicates that the metal body occurs as the continuous phase and the expanded graphite occurs as the discrete phase.

Vermicular expanded graphite used in the present invention should have an apparent bulk density of from about 0.2 to about 10.0 pounds per cubic foot (lb./ft.³) preferably about 2 to 6 lbs./ft.³. Vermicular expanded graphite having a very low bulk density in the range of 0.2 to 2.0 pounds per cubic foot should be employed primarily with very light metals such as magnesium. Graphite of this lower density is easily combined with magnesium but is resistant to combining with the other heavier metals. Such vermicular graphite is prepared from particulate naturally occurring crystalline flake graphite or crystalline lump graphite, flake graphite being preferred. The crystalline graphite is given a particular acid treatment and the so-treated flake is heated at certain operable temperatures for example, within the range of from about 150 degrees C. to about 1200 degrees C., depending on which acid treatment is used and the density desired, thereby expanding into the low density vermicular feed stock suitable for use in the present invention. The particle size of graphite to be used is not critical although ordinarily particles of from about 10 to about 325 U.S. Standard Sieve, preferably about 20 to 80 mesh, are used.

Typical of the metal bodies which are suitable for use herein include magnesium, aluminum, lead, zinc, copper, bismuth, antimony, nickel, platinum, gold, silver, tin, cadmium and alloys thereof. Reference to a metal herein is meant to include alloys containing at least 50 percent of that metal. Metals which will dissolve graphite (e.g. Fe) or will react to form carbides (e.g. Ti) are operative herein but are not particularly desirable.

In preparing the low density, well cohered composite of the instant invention, any method for intimately combining the graphite and metal is suitable. For instance, a supply of vermicular expanded graphite may be set in a container and very slightly compressed (usually only in the order of about 5 to 50 percent its original volume) into a desired shape or form thereby forming a mass of vermicular graphite containing continuous voids. A molten metal body is then drawn into the continuous voids between the worms of the vermicular graphite mass.

The actual procedure used in drawing the molten metal body into the vermicular graphite mass varies with the several metal bodies that can be used. Ordinarily a vacuum technique is employed or means provided whereby there is a pressure applied to the molten metal which is greater than the pressure in the vessel which contains the graphite. However, where magnesium is used as the metal body no external vacuum or pressure differential is required. Thus, where an airtight vermicular graphite mold (for example in an inverted beaker) is set on the surface of a molten magnesium mass, as the molten magnesium flows into the vermicular graphite mass the magnesium reacts with the residual oxygen and nitrogen remaining between the expanded graphite particles. In essence, the molten magnesium is generating its own partial vacuum.

In preparing the expanded graphite for use in the present invention, a particulate natural crystalline graphite is contacted at about room temperature with (1) a mixture of from about 8 to about 98 weight percent concentrated sulfuric acid (at least about 90 weight percent $H_2SO_4$) and from about 92 to about 2 weight percent concentrated nitric acid (at least about 60 weight percent $HNO_3$), or (2) fuming nitric acid, or (3) fuming sulfuric acid, or (4) concentrated sulfuric acid (at least about 90 weight percent $H_2SO_4$), or concentrated nitric acid (at least about 60 weight percent $HNO_3$) plus at least about 2 weight percent of a solid inorganic oxidizer such as, for example manganese dioxide, potassum permanganate, chromium trioxide, potassium chlorate and the like. The resulting mix components usually are employed on a weight proportion basis of from about 0.2–2/1 (acid member/graphite). These are maintained in contact for at least about one minute, although a lengthy contact time of hours or days in not detrimental. The acid-treated graphite now expandable, is separated from any excess acid, washed and dried if desired. The acidified graphite is then heated at about 250° C. or higher to obtain the desired degree of exfoliation or expansion.

Alternatively, another method of preparing the expandable graphite which is subsequently expanded for use in the method of the instant invention is to treat with an aqueous peroxy-halo acid, preferably perchloric or periodic acid, using an acid concentration of from about 2 to about 70 weight percent or more and an acid/graphite weight proportion of from about 0.05–2/1. The acid treated graphite, now expandable, is separated from excess acid, and dried if desired and heated to about 150° C. or more to give the expanded feed stock.

The crystalline graphite also can be anodically electrolyzed in an aqueous acidic or aqueous salt electrolyte at an electrolyte temperature of from about 0 to about 80° C. at a minimum cell potential of about 2 volts. The total quantity of electricity passed is equivalent to from about 10 to about 500 ampere-hours per pound of graphite. The electrically treated graphite, now expandable is separated from the electrolyte solution and heated. The so-formed expanded graphite feed stock has a bulk density as low as 0.1 lb./ft.$^3$ and usually less than about 2 lb./ft.$^3$ if large natural flake graphite (10 to 60 mesh) is used as the starting material. The quantity of electricity used is important in attaining the desired bulk density for the expanded graphite; 500 ampere-hours will give a product approaching 0.1 lb./ft.$^3$ and 10 ampere-hours will give a product having greater than 2 lbs./ft.$^3$ bulk density.

The actual apparent bulk density of the final expanded product is determined in part by the temperature employed in the expansion operation. Satisfactory expansion of the aqueous peroxy-halo acid treated or electrolyzed crystalline material results at temperatures above about 150–200° C. However, ordinarily a gaseous environment having a temperature of from about 250° to about 1200° C. or higher is used. Generally, as the temperature increases, the bulk density of the expanded product decreases. Ordinarily graphite from all the acid treatments set forth hereinbefore are subjected to hydrocarbon fuel flames, e.g. propane torch, oxyacetylene torch etc. or other high temperature flames for expansion. Generally, the acid-treated or electrolyzed graphite flake particulate material is placed near the flame or heated in a crucible thereby to effect expansions of from 6 to 600 fold substantially instantaneously, e.g. within a second.

The time required (in a crucible) for expansion of a given volume of expandable graphite is dependent to a large extent on the heating temperature. Generally as the temperature of the crucible is increased, the time required for expansion of the entire volume of graphite decreases. However, within the operable expansion temperature range set forth herein ordinarily the expansion is completed in less than a minute and a maximum heating period of five minutes has been found to be more than sufficient. It can be readily understood that when large quantities of graphite are to be expanded, the expanded material should be carried away from the source of heat as it is formed thereby allowing more graphite to be introduced into the heating area.

The expanded graphite resulting from this process is a vermicular, particulate product having a low apparent bulk density as set forth hereinbefore in comparison to the high density of crystalline graphite starting material. (To illustrate, a commercially available Madagascar flake graphite used as a starting material having a carbon content of greater than 80 percent and a nominal mesh size of from about 30 to about 50 U.S. Standard Sieve had an apparent bulk density of about 51.2 pounds per cubic foot.) The term "apparent bulk density" as used herein is the density determined from the volume occupied by a given mass of the product subjected to free fall (by gravity) into an open top container, e.g. a graduated cylinder.

The composition of matter of the instant invention finds utility as a low density graphite-metal composite to be used as flotation aids in water crafts. Furthermore, the instant novel, metal body-expanded graphite composite can be used in metal castings or machined metal pieces requiring low density at the expense of over-all strength. Also, the compacts of the instant invention are compressible, abradable, and somewhat deformable. Thus they find utility in applications wherein a metal part is "squeezed" into place. Nails, spikes, or screws, can relatively easily be inserted into these compacts.

The following examples will serve to further illustrate the instant invention and is in no way meant to limit it thereto.

Example I

Vermicular expanded graphite used in all of the subsequent examples was prepared in a manner shown by the following illustrations.

The graphite used herein in preparing the vermicular expanded graphite was a commercially available natural flake graphite having a particle size within the range of from about 20 to about 50 mesh U.S. Standard Sieve and an apparent bulk density of about 59.8 pounds per cubic foot (lb./ft.$^3$). To about 20 grams of the above described flake graphite were added about 14 grams of concentrated sulfuric acid and about 10 grams of concentrated nitric acid. The acid-treated flake graphite mass was stirred for a few minutes at room temperature and was then washed free of excess acid by several washings with water. The dried flakes were set in a nickel crucible preheated to about 580° C. thereby expanding to yield a vermicular expanded graphite having an apparent bulk density of about 3.29 lb./ft.$^3$.

The apparent bulk density of the vermicular expanded graphite is varied by varying the acid treatment, the initial particle size of the natural crystalline graphite, and the expansion temperature. Thus, for example expanded graphite having a density of about 0.2 lb./ft.$^3$ is prepared merely by treating a natural flake graphite having a particle size in the range of about 30 to 50 mesh with fuming $H_2SO_4$, then heating the graphite to about 1000° C. with a flame. The same natural flake graphite may be treated with perchloric acid and heated to about 250° C. to obtain a density of about 0.2 lb./ft.$^3$ for the vemicular graphite.

Example II

About 2 grams of (about 600 cc.) of vermicular expanded graphite having an apparent bulk density of about 0.2 lb./ft.$^3$ prepared as described hereinbefore, except that the acid treated graphite was heat expanded by a propane torch flame to a temperature of about 1200° C. was lightly packed to about 50 percent its original volume into a 300 cubic centimeter (cc.) stainless steel breaker. The breaker was inverted and placed on the surface of a molten magnesium mass contained in a crucible maintained at a temperature to about 840° C. The beaker was placed so that the lower extremities would remain in contact with molten metal at all times during the reaction. Within about 4 minutes the beaker containing the vermicular graphite became filled with molten magnesium. The filling of the beaker was caused by the reaction of the molten magnesium with residual air within the beaker and the displacement of such air by magnesium. The magnesium in the vermicular graphite mass was allowed to cool and solidify. A solidified mass was removed from the beaker thereby revealing a continuous phase of magnesium containing a dispersion of vermicular graphite particles.

A cubed sample cut from the composite casting and found to have a bulk density of about 0.885 gram per cubic centimeter (gm./cc.) or a density of about 50.6 percent that of a pure magnesium. Further, the same was found to contain essentially closed cells of vermicular graphite. In the same manner, a composite having a density of 1.21 gms./cc. or a density of about 68.5 percent of the pure magnesium was prepared by employing expanded graphite having a bulk density of about 2.0 lbs./ft.$^3$.

Example III

About 21 grams of vermicular expanded graphite having an initial bulk density of about 4.7 lb./ft.$^3$ prepared as described in Example I except that the acid treated graphite was heat expanded at about 475° C. was placed in a 300 cc. stainless steel beaker having a length of ¼ inch tubing inlet welded onto the bottom thereof. A strip of aluminum foil was placed over the top of the stainless steel beaker so that the vermicular expanded graphite could be retained in the beaker while said beaker is in an inverted position. The graphite-filled beaker was inverted on the surface of molten aluminum (at a temperature of about 760 degrees C.) contained in a crucible. A reduced pressure was formed in the beaker by pumping the air out of the beaker through the ¼ inch tubing attached thereto, drawing molten aluminum into the beaker. The beaker was then allowed to cool.

Cube segments were cut from the resulting aluminum-graphite composite and analyzed. The results of such analyses indicated that the product contained about 90 percent by weight aluminum and had a density of about 1.31 gm./cc. or about 48.5 percent of the density of pure aluminum.

Example IV

About 2 grams of vermicular expanded graphite having an apparent bulk density of about 0.6 lb./ft.$^3$ prepared as described in Example I except that it was heat treated at about 1000 degrees C. was packed into a 200 cc. Pyrex beaker having an 8 millimeter (mm.) glass tubing inlet fused in the bottom thereof. The vermicular expanded graphite filled breaker was inverted on the surface of molten lead (at a temperature of about 345 degrees C.) contained in a crucible. The air in the beaker was pumped out through the glass tube thereby filling the inverted *beaker with molten lead and preventing the* molten metal from flowing out of the beaker and back into the crucible.

A cube sample of the solidified casting was found to be a lead-vermicular graphite composite having a density of about 4.8 gm./cc. or about 42.5 percent that of pure lead.

Example V

Copper contained in a 3-inch diameter graphite crucible was melted in an induction furnace and maintained at about 2150 degrees F. A 2½ inch diameter graphite crucible having a graphite tube inlet screwed in the bottom thereof, containing about 15 grams of vermicular expanded graphite having an apparent bulk density of about 4.7 lb./ft.$^3$ was inverted over the surface of the molten copper. A reduced pressure was applied to the 2½ inch diameter crucible to cause it to fill with molten copper. The assembly was allowed to cool. A sample of the resulting copper composite was found to have a density of about 3.7 gm./cc. or about 42 percent that of pure copper.

Example VI

About 4 grams of vermicular expanded graphite having an apparent bulk density of about 1.6 lbs./ft.$^3$ was packed into a 200 cc. Pyrex beaker. The beaker having an inlet tube in the bottom, was inverted onto the surface of molten zinc maintained at a temperature of about 440 degrees C. Reduced pressure was applied to the beaker (via the inlet tube) thereby filling it with molten zinc. The assembly was allowed to cool and a sample of the resulting composite was found to have a bulk density of about 3.8 gm./cc. or about 53.4 percent that of pure zinc.

Example VII

In a manner similar to the foregoing vermicular expanded graphite can be infiltrated with metal bodies such as nickel, silver, gold, platinum, antimony, cadmium, tin, bismuth and alloys thereof, to produce a low density, self cohered metal body-expanded graphite composite.

Various modifications can be made in the method of the instant invention without departing from the spirit or scope thereof, for it is to be understood that we limit ourselves only as defined in the appended claims.

We claim:

1. A low density metal body-expanded graphite composite which comprises from about 0.1 to about 25 weight percent vermicular expanded graphite having a density of from about 0.2 to about 10 pounds per cubic foot dispersed throughout a matrix of a metal body, said metal body being substantially unreactive with said graphite at the melting point of said metal body, said composite being further characterized as one containing essentially closed cell voids.

2. The composition of claim 1 where said metal body is magnesium.

3. A relatively low density metal body-expanded graphite composite which comprises from about 0.1 to about 25 weight percent vermicular expanded graphite having a density of from about 2.0 to about 6 pounds per cubic foot dispersed throughout a matrix of a relatively high density metal body, said metal body being substantially unreactive with said graphite at the melting point of said metal body and having substantially no solubility therewith, said composite being further characterized as one containing essentially closed cell voids.

4. The composition of claim 3 wherein said expanded graphite-metal body composite has a density of from about 40 to about 80 percent of the density of the metal body.

5. The composition of claim 3 wherein said metal body is aluminum.

6. The composition of claim 3 wherein said metal body is lead.

7. The composition of claim 3 wherein the metal body is copper.

8. The composition of claim 3 wherein the metal body is zinc.

References Cited

UNITED STATES PATENTS

| | | | |
|---|---|---|---|
| 1,390,197 | 9/1921 | Dower | 75—135 |
| 1,597,059 | 8/1926 | Crimp | 75—135 |
| 2,170,259 | 8/1939 | Borofski | 75—135 |
| 3,239,319 | 3/1966 | Pollard | 29—191.2 |

HYLAND BIZOT, *Primary Examiner.*

RICHARD O. DEAN, *Examiner.*